(12) United States Patent
Kinouchi

(10) Patent No.: US 12,301,670 B2
(45) Date of Patent: May 13, 2025

(54) SECURITY DEVICE, METHOD, AND NON-TRANSITORY COMPUTER-READABLE MEDIA

(71) Applicant: NEC Platforms, Ltd., Kawasaki (JP)

(72) Inventor: Atsushi Kinouchi, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 128 days.

(21) Appl. No.: 18/271,380

(22) PCT Filed: Oct. 4, 2021

(86) PCT No.: PCT/JP2021/036609
§ 371 (c)(1),
(2) Date: Jul. 7, 2023

(87) PCT Pub. No.: WO2022/153621
PCT Pub. Date: Jul. 21, 2022

(65) Prior Publication Data
US 2024/0073288 A1 Feb. 29, 2024

(30) Foreign Application Priority Data
Jan. 15, 2021 (JP) .................................. 2021-004763

(51) Int. Cl.
*H04W 80/10* (2009.01)
*H04L 9/40* (2022.01)
(Continued)

(52) U.S. Cl.
CPC ........ *H04L 67/141* (2013.01); *H04L 61/2517* (2013.01); *H04L 61/5007* (2022.05); *H04L 63/0236* (2013.01)

(58) Field of Classification Search
None
See application file for complete search history.

(56) References Cited

U.S. PATENT DOCUMENTS

| | | | |
|---|---|---|---|
| 8,510,466 B2 * | 8/2013 | Goodman | H04L 65/102 709/238 |
| 2004/0128554 A1 | 7/2004 | Maher et al. | |

(Continued)

FOREIGN PATENT DOCUMENTS

| | | |
|---|---|---|
| JP | 2006-025002 A | 1/2006 |
| JP | 2006-074302 A | 3/2006 |

(Continued)

OTHER PUBLICATIONS

Extended European Search Report for EP Application No. 21919512.0, dated on May 15, 2024.

(Continued)

*Primary Examiner* — Christopher B Robinson
(74) *Attorney, Agent, or Firm* — Sughrue Mion, PLLC

(57) ABSTRACT

An address correspondence formation unit in a security device forms session-establishment address correspondence that associates a first type external address information unit of a main device, a first type external address information unit of the security device containing an IP address of the security device on a router side and a session establishment port number for a connection target telephone on a WAN side, and a terminal number and a session-establishment address information unit of the connection target telephone. The first type external address information unit of the main device contains an IP address and a session establishment port number of the main device. A setting control unit sets, to the main device, the first type external address information unit of the main device and a first type internal address information unit of the security device.

12 Claims, 5 Drawing Sheets

(51) Int. Cl.
*H04L 61/2517* (2022.01)
*H04L 61/5007* (2022.01)
*H04L 67/141* (2022.01)

(56) References Cited

U.S. PATENT DOCUMENTS

| | | | |
|---|---|---|---|
| 2006/0239255 A1* | 10/2006 | Ramachandran ... | H04L 12/6418 370/352 |
| 2007/0160058 A1* | 7/2007 | Zhou ................... | H04L 65/1043 370/395.2 |
| 2007/0189220 A1* | 8/2007 | Oberle ................ | H04L 65/1101 370/331 |
| 2011/0029678 A1* | 2/2011 | Buciuc ................ | H04L 41/0233 709/228 |
| 2011/0158224 A1 | 6/2011 | Kawauchi et al. | |
| 2012/0002665 A1* | 1/2012 | Kimura ............... | H04L 65/1076 370/352 |
| 2013/0223437 A1* | 8/2013 | Lanzinger ........... | H04L 65/1069 370/352 |
| 2014/0294009 A1 | 10/2014 | Sahara et al. | |
| 2019/0364115 A1 | 11/2019 | Asveren et al. | |

FOREIGN PATENT DOCUMENTS

| | | |
|---|---|---|
| JP | 2009-118198 A | 5/2009 |
| JP | 2010-193094 A | 9/2010 |
| JP | 2016-213773 A | 12/2016 |
| WO | WO-2008138245 A1 * | 11/2008 ....... H04L 29/12367 |

OTHER PUBLICATIONS

International Search Report for PCT Application No. PCT/JP2021/036609, mailed on Dec. 21, 2021.

JP Office Action for JP Application No. 2021-004763, mailed on Dec. 21, 2021 with English Translation.

Uchida, Naoki et al., "Hybrid VoIP Architecture Applicable to the Public Switched Telephone Network", IEICE Transactions on Communications, vol. J87-B, No. 6, Jun. 1, 2004, pp. 843-854.

* cited by examiner

SECURITY DEVICE, METHOD, AND NON-TRANSITORY COMPUTER-READABLE MEDIA

This application is a National Stage Entry of PCT/JP2021/036609 filed on Oct. 4, 2021, which claims priority from Japanese Patent Application 2021-004763 filed on Jan. 15, 2021, the contents of all of which are incorporated herein by reference, in their entirety.

TECHNICAL FIELD

The present disclosure relates to a security device, a method, and a control program.

BACKGROUND ART

In recent years, teleworking has rapidly spread due to the promotion of work style reform. In addition, the need for teleworking has only increased due to the outbreak of the novel coronavirus. It is desirable for people in teleworking to work at home or in a satellite office in an environment similar to that of an office.

For example, in an office with a key telephone system, business is conducted using dedicated telephones and extension phones. Furthermore, in an office with a key telephone system, a teleworking function via the Internet can construct an environment at home as if an employee were using an extension phone in the office. Here, in order to make a call between an office telephone connected to the key telephone system in an office and a home telephone, it is necessary that Session Initiation Protocol (SIP) packets and Real-time Transport Protocol (RTP) packets are exchanged between the key telephone system and the home telephone (for example, Patent Literature 1).

It is also necessary to ensure adequate security in order to construct a network environment via the Internet. For this reason, a security device called a session border controller, in which security such as Firewalls and Intrusion Prevention System (IPS) are operating, is generally installed. In other words, a network environment is generally established in which a key telephone system, a security device, and a router are connected in a Local Area Network (LAN).

CITATION LIST

Patent Literature

Patent Literature 1: Japanese Unexamined Patent Application Publication No. 2010-193094

SUMMARY OF INVENTION

Technical Problem

Incidentally, in order to construct a network environment for teleworking as described above, it is necessary to perform a large number of settings to the devices involved. However, these settings are highly difficult for those who are not familiar with the construction of a network environment. For this reason, at present, the construction of a network environment for teleworking as described above has not progressed as much as expected.

A purpose of the present disclosure is to provide a security device, a method, and a control program that can facilitate the construction of a network environment.

Solution to Problem

A security device according to a first aspect is a security device configured to be used by being connected to a router arranged at a boundary between a Wide Area Network (WAN) and a Local Area Network (LAN) and to a main device of a key telephone system in the LAN, the security device including:
 an acquisition unit that acquires a first Internet Protocol (IP) address of the main device on the security device side and a second IP address of the security device on the main device side;
 an address correspondence formation unit that forms session-establishment address correspondence, the session-establishment address correspondence associating a first type external address information unit of the main device containing the first IP address and a first session establishment port number, a first type external address information unit of the security device containing a third IP address of the security device on the router side and a second session establishment port number for a connection target telephone on the WAN side, and a terminal number and a session-establishment address information unit of the connection target telephone; and
 a first setting control unit that sets, to the main device, the first type external address information unit of the main device and a first type internal address information unit of the security device containing the second IP address.

A method according to a second aspect is a method to be executed by a security device configured to be used by being connected to a router arranged at a boundary between a Wide Area Network (WAN) and a Local Area Network (LAN) and to a main device of a key telephone system in the LAN, the method including:
 acquiring a first Internet Protocol (IP) address of the main device on the security device side and a second IP address of the security device on the main device side;
 forming session-establishment address correspondence, the session-establishment address correspondence associating a first type external address information unit of the main device containing the first IP address and a first session establishment port number, a first type external address information unit of the security device containing a third IP address of the security device on the router side and a second session establishment port number for a connection target telephone on the WAN side, and a terminal number and a session-establishment address information unit of the connection target telephone; and
 setting, to the main device, the first type external address information unit of the main device and a first type internal address information unit of the security device containing the second IP address.

A control program according to a third aspect causes a security device, the security device configured to be used by being connected to a router arranged at a boundary between a Wide Area Network (WAN) and a Local Area Network (LAN) and to a main device of a key telephone system in the LAN, to execute:
 acquiring a first Internet Protocol (IP) address of the main device on the security device side and a second IP address of the security device on the main device side;
 forming session-establishment address correspondence, the session-establishment address correspondence associating a first type external address information unit of the main device containing the first IP address and a first session establishment port number, a first type external address information unit of the security device containing a third IP address of the security device on the router side and a second session establishment port number for a connection target telephone on the WAN side, and a terminal number and a session-establishment address information unit of the connection target telephone; and setting, to the main device, the first type external address information unit of the main device and a first type internal address information unit of the security device containing the second IP address.

Advantageous Effects of Invention

With the present disclosure, it is possible to provide a security device, a method, and a control program that can facilitate the construction of a network environment.

EXAMPLE EMBODIMENT

Example embodiments are described below with reference to the drawings. In the example embodiments, identical or equivalent elements are denoted by the same reference signs, and redundant explanations are omitted.

First Example Embodiment

<Outline of System>

Figure 1:
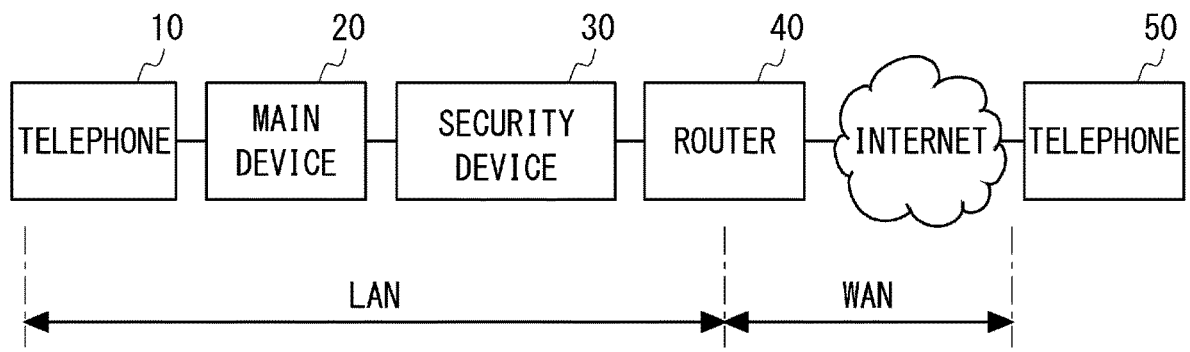
FIG. 1 is a diagram showing an example of a system in a first example embodiment.

FIG. 1 is a diagram showing an example of a system in a first example embodiment. In FIG. 1, a system 1 includes a telephone 10, a main device 20, a security device 30, a router 40, and a telephone 50. The telephone 10 is accommodated in the main device 20, and the telephone 10 and the main device constitute a key telephone system installed in an office, for example. In addition, the main device 20 is connected to the security device 30. The security device 30 is connected to the router 40. The router 40 is connected to the Internet (that is, a Wide Area Network (WAN)). In other words, the telephone 10, the main device 20, the security device 30, and the router 40 constitute a Local Area Network (LAN), and the router 40 is arranged at the boundary between the WAN and the LAN. The telephone 50 is connected to the router 40 via at least the Internet.

Here, in order to construct a network environment that allows calls between the telephone 10 and the telephone 50 as if it were an extension call between two telephones 10 in the above key telephone system in an office, it is necessary to install the security device 30 and the router 40 in the LAN. In addition, it is necessary to perform a large number of settings to the main device 20, the security device 30, and the router 40. These settings are highly difficult for those who are not familiar with the construction of a network environment.

Therefore, in the example embodiment, the security device 30 performs processing to achieve the above settings.

After the above settings are completed, a "session establishment procedure" is performed between the main device 20 and the telephone 50. For example, a Session Initiation Protocol (SIP) is used for "session establishment". Then, after session establishment, voice packets are transmitted and received between the main device 20 (the telephone 10) and the telephone 50. For example, a Real-time Transport Protocol (RTP) is used to transmit and receive the voice packets. Hereafter, voice packets can be referred to as "RTP packets".

The number of the respective devices included in the system 1 is not limited to one, but may be two or more. For example, the number of the respective telephones 10 and telephones 50 included in the system 1 is not limited to one, but may be two or more.

In the example embodiment, the WAN side is referred to as "external", and the side opposite to "external" is referred to as "internal" with respect to a target device included in the LAN. That is, when the security device 30 is a target device, the main device 20 side is "internal" and the router 40 side is "external".

<Configuration Example of Security Device>

Figure 2:
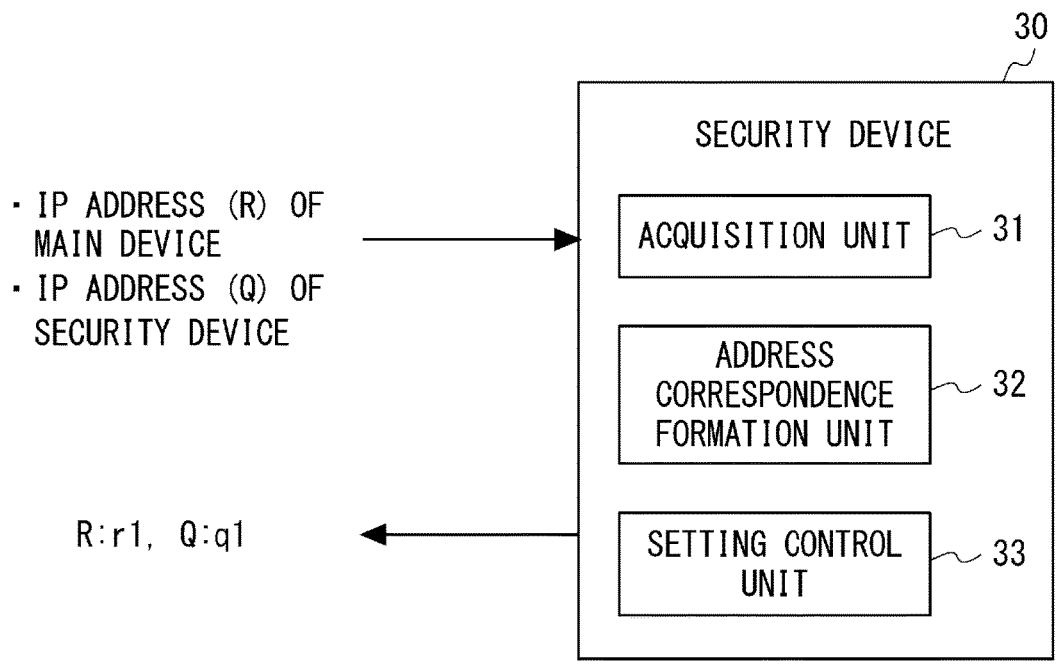
FIG. 2 is a block diagram showing an example of a security device in the first example embodiment.

FIG. 2 is a block diagram showing an example of the security device in the first example embodiment. In FIG. 2, the security device 30 includes an acquisition unit 31, an address correspondence formation unit 32, and a setting control unit (first setting control unit) 33.

The acquisition unit 31 acquires an IP address of the main device 20 (hereinafter, the IP address can be referred to as a "first IP address". The first IP address can also be expressed as "IP:R" or "R"). For example, the acquisition unit 31 may acquire the IP address of the main device 20 from the main device 20 using a dedicated Application Programming Interface (API). In addition, the acquisition unit 31 may transmit an "address request" to the main device 20 to acquire an IP address assigned to the security device 30 by the Dynamic Host Configuration Protocol (DHCP) function (not shown) of the main device 20 (hereinafter, the IP address can be referred to as a "second IP address". The "second IP address" can also be expressed as "IP:Q" or "Q").

Based on the information acquired by the acquisition unit 31, the address correspondence formation unit 32 associates a first type external address information unit (R:r1) of the main device 20 containing the first IP address (R) and a "first session establishment port number (r1)" and a first type external address information unit (P:p1) of a security device 30 containing a "third IP address (P)" of the security device 30 on the router 40 side and a "second session establishment port number (p1)" for a connection target telephone on the WAN side (that is, the telephone 50). The address correspondence formation unit 32 also associates a session-establishment address information unit (G:g1) of the connection target telephone on the WAN side (that is, telephone 50) and a "terminal number", which will be described later, of the telephone 50. Here, an "address information unit" represents a pair of an IP address and a port number, and an "external address information unit" represents an "address information unit" of a target device on the WAN side. In addition, a "first type external address information unit" represents an "external address information unit" containing a session establishment port number.

The setting control unit (first setting control unit) 33 sets an address information unit to be used for a session establishment protocol to the main device 20. For example, the setting control unit (first setting control unit) 33 sets the first type external address information unit (R:r1) of the main device 20 and a first type internal address information unit (Q:q1) of the security device 30 to the main device 20. For example, the setting control unit (first setting control unit) 33 may set the above address information units to the main device 20 using a dedicated Application Programming Interface (API). Note that, the same address information units are assumed to be used for the first type external address information unit (R:r1) of the main device 20 and the first type internal address information unit (Q:q1) of the security device 30, even if another telephone 10 and another telephone 50 are used.

With the configuration of the security device 30 described above, it is possible to set up a network environment between the main device 20 and the security device 30 for session establishment.

Second Example Embodiment

A second example embodiment mainly relates to setting up of a network environment between a security device and a router for session establishment. Note that the basic configuration of a system in the second example embodiment is the same as that of the system 1 in the first example embodiment, and is described with reference to FIG. 1. That is, a system 1 in the second example embodiment can be implemented by replacing the security device 30 in the system 1 in the first embodiment with a security device 60, which will be described later.

<Configuration Example of Security Device>

Figure 3:
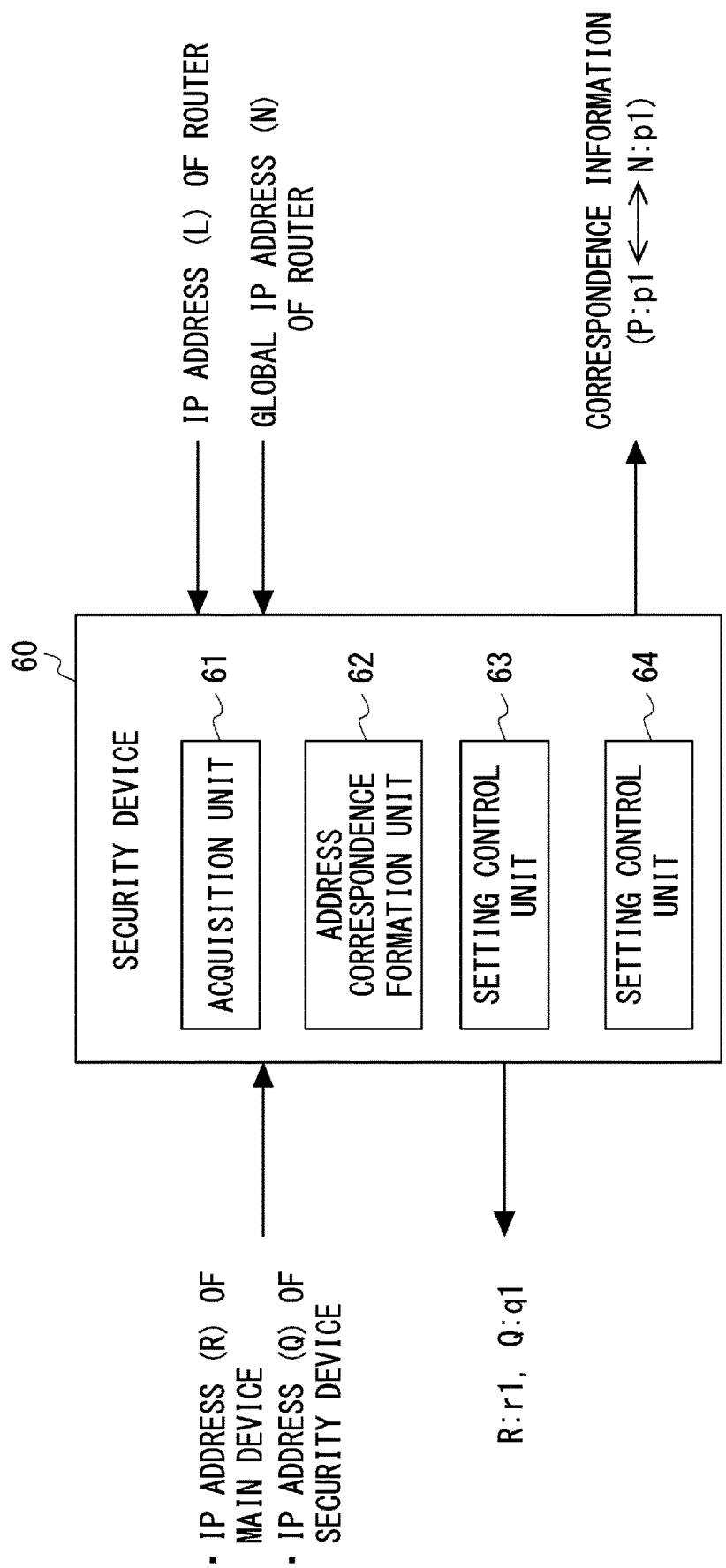
FIG. 3 is a block diagram showing an example of a security device in a second example embodiment.

FIG. 3 is a block diagram showing an example of a security device in the second example embodiment. In FIG. 3, the security device 60 includes an acquisition unit 61, an address correspondence formation unit 62, a setting control unit (first setting control unit) 63, and a setting control unit (second setting control unit) 64.

The acquisition unit 61 acquires a first IP address (R) of a main device 20 and a second IP address (Q) of the security device similarly to the acquisition unit 31 in the first example embodiment. The acquisition unit 61 further acquires an IP address of a router 40 on the security device 60 side (hereinafter, the IP address can be referred to as a "fourth IP address". The "fourth IP address" can also be referred to as "IP:L" or "L") from the router 40. For example, the acquisition unit 61 may acquire the fourth IP address assigned to the router 40 from the router 40 by Universal Plug and Play (UPnP). In this case, the acquisition unit 61 may acquire the IP address assigned to the security device 60 by the DHCP function (not shown) of the router 40 (that is, the "third IP address" described above. Hereinafter, the "third IP address" can be referred to as "IP:P" or "P"). The "third IP Address" is an IP address of the security device 60 on the router 40 side.

The acquisition unit 61 further acquires a global IP address of the router 40 (hereinafter, the global IP address can be referred to as a "first global IP address". The first global IP address can also be referred to as "IP:N" or "N"). For example, the acquisition unit 61 may acquire the first global IP address (N) of the router 40 from the router 40 by Universal Plug and Play (UPnP).

The address correspondence formation unit 62 forms "session-establishment address correspondence" based on the information acquired by the acquisition unit 61. The session-establishment address correspondence associates a first type external address information unit (R:r1) of the main device 20 and a first type external address information unit (P:p1) of the security device 60 similarly to the first example embodiment. In addition, the session-establishment address correspondence associates a session-establishment address information unit (G:g1) of a connection target telephone on the WAN side (that is, a telephone 50) and a "terminal number" of the telephone 50. Furthermore, the session-establishment address correspondence associates the first type external address information unit (P:p1) of the security device 60 and a first type external address information unit (N:p1) of the router 40. The first type external address information unit (P:p1) of the security device 60 contains the third IP address (P) of the security device 60 and a second session establishment port number (p1) for the connection target telephone (that is, the telephone 50). The first type external address information unit (N:p1) of the router 40 contains the first global IP address (N) and a second session establishment port number (p1). Here, the second session establishment port number (p1) is a session establishment port number determined in advance for the telephone 50 and has been set to the telephone 50.

The setting control unit (first setting control unit) 63 sets the first type external address information unit (R:r1) of the main device 20 and a first type internal address information unit (Q:q1) of the security device 60 to the main device 20 similarly to the setting control unit 33 in the first implementation.

The setting control unit (second setting control unit) 64 performs control to set, to the router 40, the correspondence between the first type external address information unit (P:p1) of the security device 60 and the first type external address information unit (N:p1) of the router 40 in the session-establishment address correspondence. By this control, the correspondence between the first type external address information unit (P:p1) of the security device 60 and the first type external address information unit (N:p1) of the router 40 (that is, "correspondence information") is transmitted from the security device 60 to the router 40 and maintained at the router 40. Note that the setting control unit (second setting control unit) 64 may set the above correspondence to the router 40 by Universal Plug and Play (UPnP).

With the configuration of the security device 60 described above, it is possible to set up a network environment between the security device 60 and the router 40 for session establishment.

In the above explanation, for convenience, the setting control unit (first setting control unit) 63 and the setting control unit (second setting control unit) 64 are described as separate functional units. However, the setting control unit (first setting control unit) 63 and the setting control unit (second setting control unit) 64 may be a single functional unit.

<Operation Example of Security Device>

The following is an example of the processing operation of a security device having the above configuration.

When the security device 60 and the router 40 are connected via, for example, a cable, the acquisition unit 61 of the security device 60 acquires, from the router 40, the fourth IP address (L) of the router 40 and the third IP address (P) of the security device 60. In addition, the acquisition unit 61 acquires the first global IP address (N) of the router 40.

In addition, when the security device 60 and the main device 20 are connected via, for example, a cable, the acquisition unit 61 acquires the second IP address (Q) of the security device 60 from the main device 20. The acquisition unit 61 further acquires the first IP address (R) of the main device 20.

The address correspondence formation unit 62 forms the "session-establishment address correspondence" based on the information acquired by the acquisition unit 61.

The setting control unit 63 sets, to the main device 20, the first type external address information unit (R:r1) of the main device 20 and the first type internal address information unit (Q:q1) of a security device 60.

The setting control unit 64 performs control to set, to the router 40, the correspondence between the first type external address information unit (P:p1) of the security device 60 and the first type external address information unit (N:p1) of the router 40 in the session-establishment address correspondence.

Here, when telephone 50 is connected, the telephone 50 transmits a session establishment message to the first type external address information unit (N:p1) of the router 40 that has been set in advance. The session establishment message contains the session-establishment address information unit (G:g1) of the telephone 50 as the "source address" and the first type external address information unit (N:p1) of the router 40 as the "destination address", and contains the "terminal number" of the telephone 50 in the data part of the session establishment message. The session establishment message may be, for example, SIP REGISTER.

The router 40 receives the session establishment message output from the telephone 50 and transmits, to the security device 60, a session establishment message in which the "destination address" has been changed to the first type external address information unit (P:p1) of the security device 60 based on the set correspondence.

The security device 60 receives the session establishment message received from the router 40 and transmits, to the main device 20, a session establishment message in which the "source address" has been changed to the first type internal address information unit (Q:q1) of the security device 30 and the "destination address" has been changed to the first type external address information unit (R:r1) of the main device 20. At this time, the address correspondence formation unit 62 associates the session-establishment address information unit (G:g1) of the telephone 50 and the "terminal number" of the telephone 50 that are contained in the session establishment message.

The main device 20 receives the session establishment message received from the security device and maintains the "terminal number" of the telephone 50.

Third Example Embodiment

A third example embodiment relates to transmission of a session establishment message (SIP packet) and transmission of a real-time data signal (RTP packet) that are performed after the setting processing described in the second example embodiment is completed. Note that the basic configuration of a system in the third example embodiment is the same as that of the system 1 in the first example embodiment, and is described with reference to FIG. 1. That is, a system 1 in the third example embodiment can be implemented by replacing the security device 30 in the system 1 in the first example embodiment with a security device 70, which will be described later.
<Configuration Example of Security Device>

Figure 4:
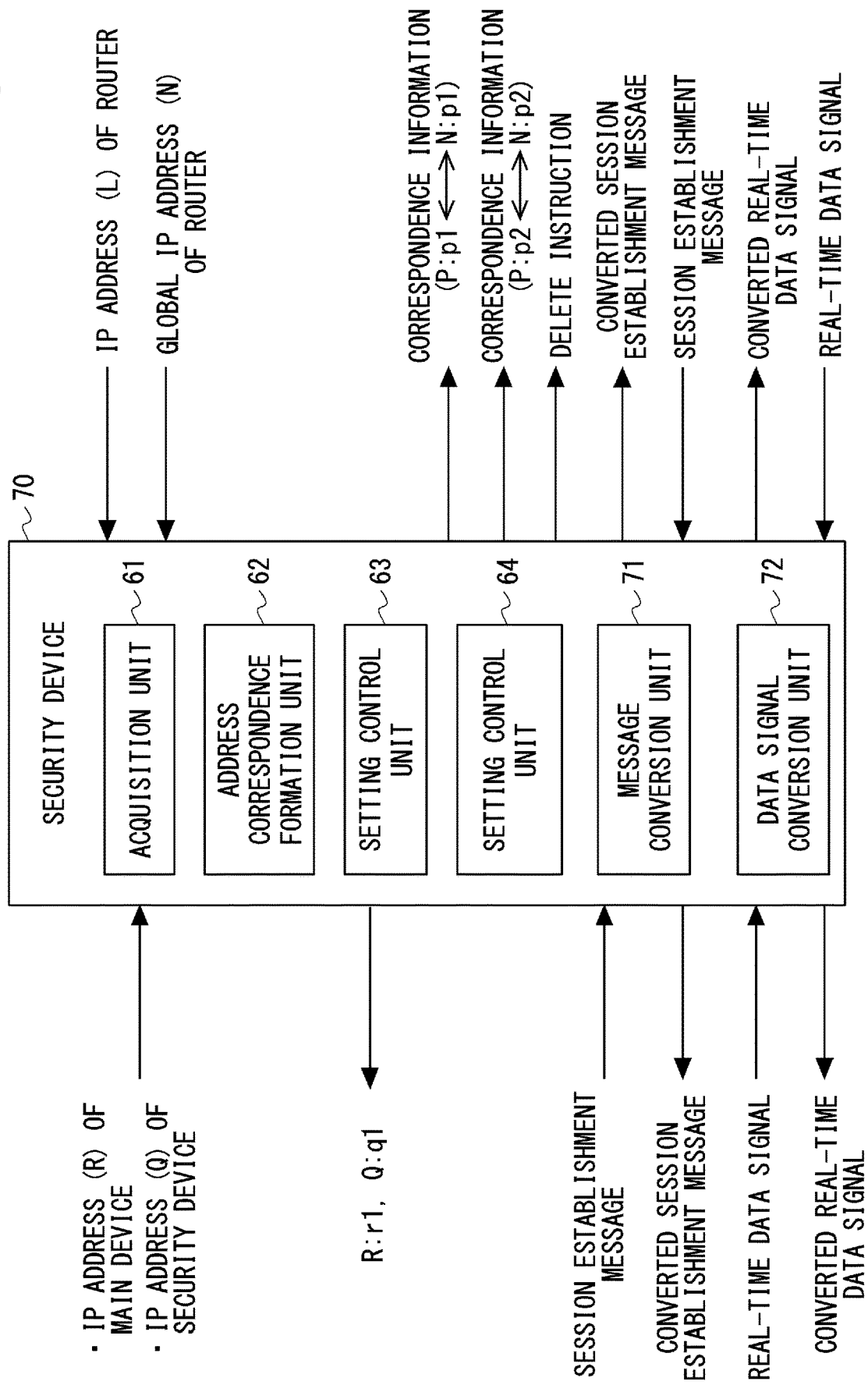
FIG. 4 is a block diagram showing an example of a security device in a third example embodiment.

FIG. 4 is a block diagram showing an example of a security device in the third example embodiment. In FIG. 4, the security device 70 includes an acquisition unit 61, an address correspondence formation unit 62, a setting control unit (first setting control unit) 63, a setting control unit (second setting control unit) 64, a message conversion unit 71, and a data signal conversion unit 72.

The message conversion unit 71 receives a session establishment message (hereinafter, referred to as a "first session establishment message") from a main device 20 and converts the first session establishment message to form a converted first session establishment message addressed to a telephone 50. The converted first session establishment message is output to a router 40.

The first session establishment message contains a first type external address information unit (R:r1) of the main device 20 as the "source address and a first type internal address information unit (Q:q1) of the security device 70 as the "destination address", and contains a second type external address information unit (R:r2) of the main device 20 and a "terminal number (IDT)" of the telephone 50 in the data part of the first session establishment message. The second type external address information unit (R:r2) contains a first IP address (R) of the main device 20 and a real-time data transmission port (hereinafter, the real-time data transmission port can be referred to as a "first real-time data transmission port". The "first real-time data transmission port" is also expressed as "r2"). The "second type external address information unit (R:r2)" of the main device 20 contained in the data part of the first session establishment message is used for NAT traversal.

The converted first session establishment message contains a first type external address information unit (P:p1) of the security device 70 as the "source address", a session-establishment address information unit (G:g1) of the telephone 50 corresponding to a "terminal number (IDT)" of the telephone 50 as the "destination address", and contains a "second type external address information unit (N:p2)" of the router 40 in the data part of the converted first session establishment message. The "second type external address information unit (N:p2)" of the router 40 contains a first global IP address (N) and a real-time data transmission port for the telephone 50 (hereinafter, the real-time data transmission port can be referred to as the "second real-time data transmission port". The "second real-time data transmission port" can also be expressed as "p2"). Here, the "second type external address information unit" represents an "external address information unit" containing a real-time data transmission port.

That is, the message conversion unit 71 assigns the second real-time data transmission port (P2) as the real-time data transmission port for the telephone 50. In other words, the message conversion unit 71 assigns a second type external address information unit (P:p2) of the security device 70 and the "second type external address information unit (N:p2)" of the router 40. Here, the setting control unit (second setting control unit) 64 in the third example embodiment sets, to the router 40, the correspondence between the second type external address information unit (N:p2) contained in the data part of the converted first session establishment message and the second type external address information unit (P:p2) of the security device 70.

Here, the address correspondence formation unit 62 in the third example embodiment forms "real-time data transmission address correspondence". The "real-time data transmission address correspondence" associates the "second type external address information unit (R:r2)" of the main device 20 and the second type external address information unit (P:p2) of the security device 70.

In addition, the message conversion unit 71 receives a session establishment message from the router 40 (hereinafter, referred to as a "second session establishment message") and converts the second session establishment message to form a converted second session establishment message addressed to the main device 20. The converted second session establishment message is output to the main device 20.

The second session establishment message contains the session-establishment address information unit (G:g1) of the telephone 50 as the "source address" and the first type external address information unit (P:p1) of the security device 70 as the "destination address", and contains a real-time data transmission address information unit (G:g2) of the telephone 50 in the data part. The real-time data transmission address information unit (G:g2) of the telephone 50 contained in the data part of the second session establishment message is used for NAT traversal.

The converted second session establishment message contains the first type internal address information unit (Q:q1) of the security device 70 as the "source address" and the first type external address information unit (R:r1) of the main device 20 as the "destination address", and contains a second type internal address information unit (Q:q2) of the security device 70 in the data part. The second type internal address information unit (Q:q2) of the security device 70 contains a second IP address (Q) of the security device 70 and a real-time data transmission port for the telephone 50 (hereinafter, the real-time data transmission port can be referred to as a "third real-time data transmission port". The "third real-time data transmission port" can be expressed as "q2").

That is, the message conversion unit 71 assigns the third real-time data transmission port (q2) as the real-time data transmission port for the telephone 50. In other words, the message conversion unit 71 assigns the second type internal address information unit (Q:q2) of the security device 70. The second type internal address information unit (Q:q2) of the security device 70 contained in the data part of the converted second session establishment message is used as the "destination address" when the main device 20 transmits a real-time data signal.

Here, the address correspondence formation unit 62 in the third example embodiment adds the real-time data transmission address information unit (G:g2) of the telephone 50 and the second type internal address information unit (Q:q2) of the security device 70 to the above "real-time data transmission address correspondence". Using the "real-time data transmission address correspondence" enables the real-time data signal conversion unit 72, which will be described later, to convert the real-time data signal.

The data signal conversion unit 72 receives the real-time data signal (hereinafter, referred to as a "first real-time data signal") from the main device 20 and converts the first real-time data signals to form a converted first real-time data signal addressed to the telephone 50. For this conversion, the above "real-time data transmission address correspondence" is used. The converted first real-time data signal is output to the router 40. The first real-time data signal and a second real-time data signal, which will be described later, are real-time data signals exchanged between the telephone 10 and the telephone 50. Note that, the data signal conversion unit 72 may encrypt the converted first real-time data signal.

The first real-time data signal contains the second type external address information unit (R:r2) of the main device 20 as the "source address" and the second type internal address information unit (Q:q2) of the security device 70 as the "destination address".

The converted first real-time data signal contains the second type external address information unit (P:p2) of the security device 70 as the "source address" and the real-time data transmission address information unit (G:g2) of the telephone 50 as the "destination address".

In addition, the data signal conversion unit 72 receives a real-time data signal from the router 40 (hereinafter, referred to as a "second real-time data signal") and converts the second real-time data signal to form a converted second real-time data signal addressed to the main device 20. For this conversion, the above "real-time data transmission address correspondence" is used. The converted second real-time data signal is output to the main device 20. Note that, if the second real-time data signal is encrypted, the data signal conversion unit 72 may decrypt the second real-time data signal. This allows the security device 70 to implement the encryption/decryption functions to prevent eavesdropping, since the real-time data signal is converted by the security device 70.

The second real-time data signal contains the real-time data transmission address information unit (G:g2) of the telephone 50 as the "source address" and the second type external address information unit (P:p2) of the security device 70 as the "destination address".

The converted second real-time data signal contains the second type internal address information unit (Q:q2) of the security device 70 as the "source address" and the second type external address information unit (R:r2) of the main device 20 as the "destination address.

Here, in the third example embodiment, the setting control unit (second setting control unit) 64 performs control to delete the correspondence set in the router 40 when the session for transmission of the real-time data signals between the telephone 10 and the telephone 50 is terminated (that is, when the call is terminated). The correspondence to be deleted is the correspondence between the second type external address information unit (P:p2) of the security device 70 and the second type external address information unit (N:p2) of the router 40. This enhances security because there is no need to register a plurality of port numbers in advance on the router 40.

In the third example embodiment, the address correspondence formation unit 62 may delete the above "real-time data transmission address correspondence" when the session for transmission of the real-time data signals between the telephone 10 and the telephone 50 is terminated (that is, when the call is terminated).

<Operation Example of System>

Figure 5:
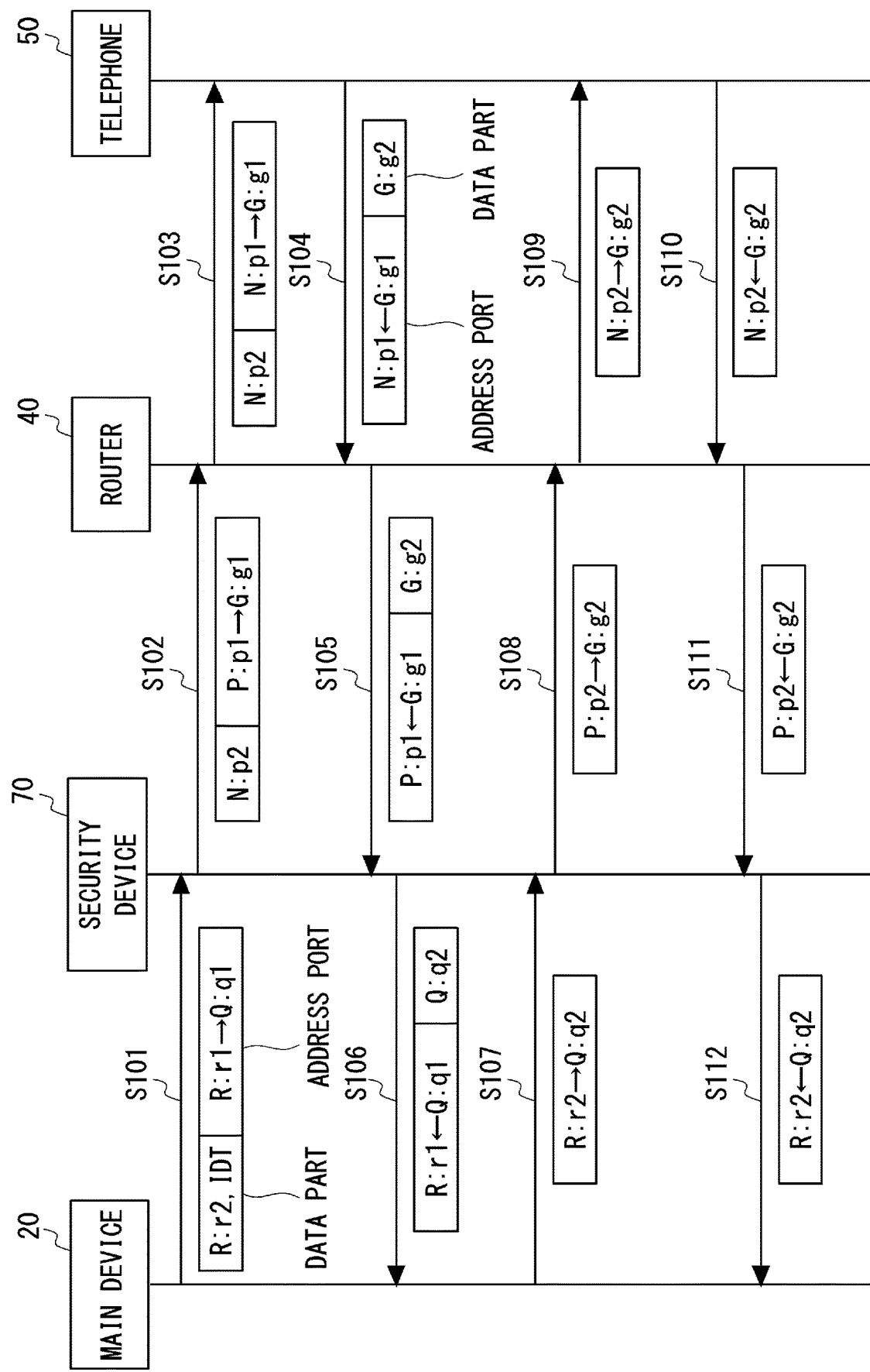
FIG. 5 is a diagram for explaining a processing operation of a system in the third example embodiment.

An operation example of the system in the third example embodiment is described below. FIG. 5 is a diagram for explaining a processing operation of the system in the third example embodiment.

The main device 20 transmits a first session establishment message to the security device 70 (step S101). The first session establishment message contains the first type external address information unit (R:r1) of the main device 20 as the "source address" and the first type internal address information unit (Q:q1) of the security device 70 as the "destination address", and contains the "second type external address information unit (R:r2)" of the main device 20 and the "terminal number (IDT)" of the telephone 50 in the data part of the first session establishment message.

In the security device 70, the message conversion unit 71 converts the first session establishment message to form a converted first session establishment message. The converted first session establishment message contains the first type external address information unit (P:p1) of the security device 70 as the "source address" and the session-establishment address information unit (G:g1) of the telephone 50 corresponding to the "terminal number (IDT)" of the telephone 50 as the "destination address", and contains the "second type external address information unit (N:p2)" of the router 40 in the data part of the converted first session establishment message.

The setting control unit (second setting control unit) 64 sets, to the router 40, the correspondence between the second type external address information unit (N:p2) contained in the data part of the converted first session establishment message and the second type external address information unit (P:p2) of the security device 70.

The address correspondence formation unit 62 forms "real-time data transmission address correspondence. The "real-time data transmission address correspondence" associates the "second type external address information unit (R:r2)" of the main device 20 and the "second type external address information unit (P:p2)" of the security device 70.

Then, the security device 70 outputs the converted first session establishment message to the router 40 (step S102).

The router 40 receives the first session establishment message output from the security device 70 and changes the "source address" in the first session establishment message from the first type external address information unit (P:p1) of the security device 70 to the first type external address information unit (N:p1) of the router 40. At this time, the correspondence, which has been set by the setting control unit (second setting control unit) 64, between the first type external address information unit (P:p1) of the security device 70 and the first type external address information unit (N:p1) of the router 40 is used.

Then, the router 40 transmits, to the telephone 50, the first session establishment message in which the "source address" has been changed (step S103).

The telephone 50 transmits a second session establishment message to the router 40 (step S104). The second session establishment message contains the session-establishment address information unit (G:g1) of the telephone 50 as the "source address" and the first type external address information unit (N:p1) of the router 40 as the "destination address", and contains the real-time data transmission address information unit (G:g2) of the telephone 50 in the data part.

The router 40 receives the second session establishment message transmitted from the telephone 50 and changes the "destination address" in the second session establishment message from the first type external address information unit (N:p1) of the router 40 to the first type external address information unit (P:p1) of the security device 70. At this time, the correspondence between the first type external address information unit (P:p1) of the security device 70 and the first type external address information unit (N:p1) of the router 40 is used.

Then, the router 40 outputs, to the security device 70, the second session establishment message in which the "destination address" has been changed (step S105).

In the security device 70, the message conversion unit 71 receives the second session establishment message from the router 40. At this time, the message conversion unit 71 assigns the third real-time data transmission port (q2) as the real-time data transmission port for the telephone 50. Then, the message conversion unit 71 converts the second session establishment message received from the router 40 to form a converted second session establishment message. The converted second session establishment message contains the first type internal address information unit (Q:q1) of the security device 70 as the "source address" and the first type external address information unit (R:r1) of the main device 20 as the "destination address", and contains the second type internal address information unit (Q:q2) of the security device 70 in the data part.

The address correspondence formation unit 62 adds the real-time data transmission address information unit (G:g2) of the telephone 50 and the second type internal address information unit (Q:q2) of the security device 70 to the above "real-time data transmission address correspondence".

Then, the security device 70 outputs the converted second session establishment message to the main device 20 (step S106). Then, the main device 20 can associate the second type external address information unit (R:r2) of the main device 20 contained in the data part of the first session establishment message and the second type internal address information unit (Q:q2) of the security device 70 contained in the data part of the converted second session establishment message. Then, if the second type external address information unit (R:r2) of the main device 20 is associated with the address of the telephone 10, a session between the telephone 10 and the telephone 50 is established.

The main device 20 outputs a first real-time data signal to the security device 70 (step S107). The first real-time data signal has been received by the main device 20 from the telephone 10. The first real-time data signal contains the second type external address information unit (R:r2) of the main device 20 as the "source address" and the second type internal address information unit (Q:q2) of the security device 70 as the "destination address".

In the security device 70, the data signal conversion unit 72 converts the first real-time data signal to form a converted first real-time data signal. The converted first real-time data signal contains the second type external address information unit (P:p2) of the security device 70 as the "source address" and the real-time data transmission address information unit (G:g2) of the telephone 50 as the "destination address". For this conversion, the above "real-time data transmission address correspondence" is used.

Then, the security device 70 outputs the converted first real-time data signal to the router 40 (step S108).

The router 40 receives the first real-time data signal output from the security device 70 and changes the "source address" in the first real-time data signal from the second type external address information unit (P:p2) of the security device 70 to the second type external address information unit (N:p2). At this time, the correspondence, which has been set by the setting control unit (second setting control unit) 64, between the second type external address information unit (N:p2) and the second type external address information unit (P:p2) of the security device 70 is used.

Then, the router 40 transmits, to the telephone 50, the first real-time data signal in which the "source address" has been changed (step S109).

The telephone 50 transmits a second real-time data signal to the router 40 (step S110). The second real-time data signal contains the real-time data transmission address information unit (G:g2) of the telephone 50 as the "source address" and the second type external address information unit (N:p2) of the router 40 as the "destination address".

The router 40 receives the second real-time data signal transmitted from the telephone 50 and changes the "destination address" in the second real-time data signal from the second type external address information unit (N:p2) of the router 40 to the second type external address information unit (P:p2) of the security device 70. At this time, the correspondence, which has been set by the setting control unit (second setting control unit) 64, between the second type external address information unit (N:p2) and the second type external address information unit (P:p2) of the security device 70 is used.

Then, the router 40 outputs, to the security device 70, the second real-time data signal in which the "destination address" has been changed (step S111).

In the Security device 70, the data signal conversion unit 72 converts the second real-time data signal to form a converted second real-time data signal. The converted second real-time data signal contains the second type internal address information unit (Q:q2) of the security device 70 as the "source address" and the second type external address information unit (R:r2) of the main device 20 as the "destination address. For this conversion, the above "real-time data transmission address correspondence" is used.

The security device 70 outputs the converted second real-time data signal to the main device 20 (step S112). The main device 20 outputs the received second real-time data signal to the telephone 10.

Then, the setting control unit (second setting control unit) 64 performs control to delete the correspondence set in the router 40 when the session for transmission of the real-time data signals between the telephone 10 and the telephone 50 is terminated (that is, when the call is terminated). The correspondence to be deleted is the correspondence between the second type external address information unit (P:p2) of the security device 70 and the second type external address information unit (N:p2) of the router 40.

Modified Example

In the above explanation, the correspondence between the second type external address information unit (N:p2) and the second type external address information unit (P:p2) of the security device 70 is set in the router 40 as the "real-time data transmission address correspondence", but the "real-time data transmission address correspondence" is not limited thereto. For example, the correspondence between the second type external address information unit (N:p2) and the second type external address information unit (R:r2) of the main device may be set in the router 40. This allows direct transmission of the real-time data signals between the main device 20 (telephone 10) and the telephone 50, and it is possible to reduce the load on the security device 70 and the bandwidth of the LAN.

Other Example Embodiments

<1> In FIG. 1, the main device 20 is connected to the security device 30 (60, 70), and the security device 30 (60, 70) is connected to the router 40, but the present disclosure is not limited thereto. For example, the main device 20 (telephone 10), the security device 30 (60, 70), and the router 40 may be connected via a network to form a LAN.

Figure 6:
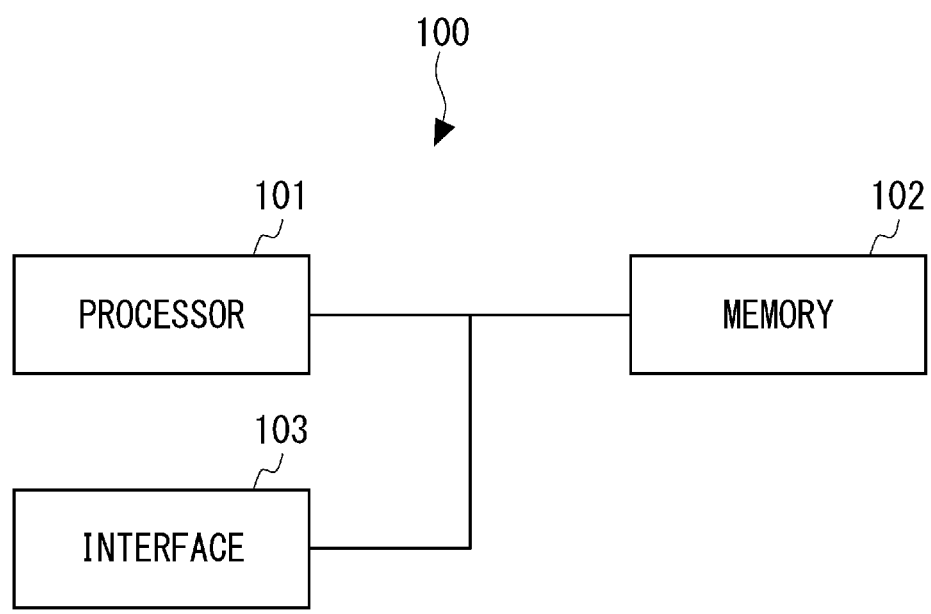
FIG. 6 is a diagram showing a hardware configuration example of a security device.

<2> FIG. 6 is a diagram showing a hardware configuration example of a security device. In FIG. 6, a security device 100 includes a processor 101, a memory 102, and an interface 103. The processor 101 may be, for example, a microprocessor, a Micro Processing Unit (MPU), or a Central Processing Unit (CPU). The processor 101 may include a plurality of processors. The memory 102 is constituted by a combination of a volatile memory and a non-volatile memory. The memory 102 may include a storage arranged away from the processor 101. In this case, the processor 101 may access the memory 102 via an I/O interface, which is not shown.

The security devices 30, 60, and 70 in the first to third example embodiments can each have the hardware configuration shown in FIG. 6. The acquisition units 31 and 61, the address correspondence formation units 32 and 62, the setting control units (first setting control units) 33 and 63, the setting control unit (second setting control unit) 64, the message conversion unit 71, and the data signal conversion unit 72 of the security devices 30, 60, and 70 in the first to third example embodiments can be implemented by the processor 101 loading and executing programs stored in the memory 102. The programs can be stored by various types of non-transitory computer-readable media and provided to the security devices 30, 60, and 70. Examples of non-transitory computer-readable media include magnetic storage media (such as flexible disks, magnetic tapes, and hard disk drives), optical magnetic storage media (such as magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, and Random Access Memory (RAM)). The programs may be provided to the security devices 30, 60, and 70 using any type of transitory computer-readable media. Examples of transitory computer-readable media include electric signals, optical signals, and electromagnetic waves. Transitory computer-readable media can provide the programs to the security devices 30, 60, and 70 through a wired communication line (such as electric wires, and optical fibers) or a wireless communication line.

The present invention has been described above with reference to the example embodiments but is not limited by the above. Various modifications that can be understood by those skilled in the art can be made to the configurations and the details of the present invention within the scope of the invention.

A part or all of the above example embodiments may be described as the following Supplementary notes but are not limited to the following.

(Supplementary Note 1)

A security device configured to be used by being connected to a router arranged at a boundary between a Wide Area Network (WAN) and a Local Area Network (LAN) and to a main device of a key telephone system in the LAN, the security device comprising:

an acquisition unit for acquiring a first Internet Protocol (IP) address (R) of the main device on the security device side and a second IP address (Q) of the security device on the main device side;

an address correspondence formation unit for forming session-establishment address correspondence, the session-establishment address correspondence associating a first type external address information unit (R:r1) of the main device containing the first IP address (R) and a first session establishment port number (r1), a first type external address information unit (P:p1) of the security device containing a third IP address (P) of the security device on the router side and a second session establishment port number (p1) for a connection target telephone on the WAN side, and a terminal number (IDT) and a session-establishment address information unit (G:g1) of the connection target telephone; and a first setting control unit for setting, to the main device, the first type external address information unit (R:r1) of the main device and a first type internal address information unit (Q:q1) of the security device containing the second IP address (Q).

(Supplementary Note 2)

The security device according to Supplementary note 1, wherein the acquisition unit further acquires a fourth IP address (L) of the router, the fourth IP address being an IP address of the router on the security device side, and a first global IP address (N) of the router.

(Supplementary Note 3)

The security device according to Supplementary note 2, wherein the session-establishment address correspondence associates the first type external address information unit (R:r1) of the main device, the first type external address information unit (P:p1) of the security device, the terminal number (IDT) and session-establishment address information unit (G:g1) of the connection target telephone, the first type external address information unit (P:p1) of the security device, and a first type external address information unit (N:p1) of the router containing the first global IP address (N) and the second session establishment port number (p1).

(Supplementary Note 4)

The security device according to Supplementary note 3, further comprising a second setting control unit for setting, to the router, the correspondence between the first type external address information unit (P:p1) of the security device and the first type external address information unit (N:p1) of the router in the session-establishment address correspondence.

(Supplementary Note 5)

The security device according to Supplementary note 4, further comprising a message conversion unit for receiving a first session establishment message transmitted from the main device, the first session establishment message containing the first type external address information unit (R:r1) of the main device as a source address and the first type internal address information unit (Q:q1) of the security device as a destination address, and containing a second type external address information unit (R:r2) containing the first IP address (R) and a first real-time data transmission port (r2) of the main device in a data part of the first session establishment message, and for converting the received first session establishment message to form a converted first session establishment message addressed to the connection target telephone, wherein the converted first session establishment message contains the first type external address information unit (P:p1) of the security device as a source address and the session-establishment address information unit (G:g1) of the connection target telephone as a destination address, and contains a second type external address information unit (N:p2) of the router containing the first global IP address (N) and a second real-time data transmission port (p2) for the connection target telephone in a data part of the converted first session establishment message, and the second setting control unit sets, to the router, correspondence between a second type external address information unit (P:p2) of the security device containing the third IP address (P) and the second real-time data transmission port (p2) and the second type external address information unit (N:p2) of the router.

(Supplementary Note 6)

The security device according to Supplementary note 5, wherein the message conversion unit receives a second session establishment message containing the session-establishment address information unit (G:g1) of the connection target telephone as a source address and the first type external address information unit (P:p1) of the security device as a destination address, and containing a real-time data transmission address information unit (G:g2) of the connection target telephone in a data part, and converts the received second session establishment message to form a converted second session establishment message addressed to the main device, and the converted second session establishment message contains the first type internal address information unit (Q:q1) of the security device as a source address and the first type external address information unit (R:r1) of the main device as a destination address, and contains a second type internal address information unit (Q:q2) of the security device containing the second IP address (Q) and a third real-time data transmission port (q2) for the connection target telephone in a data part.

(Supplementary Note 7)

The security device according to Supplementary note 6, further comprising a data signal conversion unit for receiving a real-time data signal containing a second type external address information unit (R:r2) of the main device as a source address and the second type internal address information unit (Q:q2) of the security device as a destination address and for converting the received real-time data signal to form a converted real-time data signal, wherein the converted real-time data signal contains the second type external address information unit (P:p2) of the security device as a source address and the real-time data transmission address information unit (G:g2) of the connection target telephone as a destination address.

(Supplementary Note 8)

The security device according to Supplementary note 7, wherein the second setting control unit deletes, when a session for transmission of the real-time data signal between the connection target telephone and another telephone accommodated in the main device is terminated, the correspondence between the second type external address information unit (P:p2) of the security device and the second type external address information unit (N:p2) of the router, the correspondence being set in the router.

(Supplementary Note 9)

The security device according to Supplementary note 5 or 6, wherein the first session establishment message and the second session establishment message are Session Initiation Protocol (SIP) packets.

(Supplementary Note 10)

The security device according to Supplementary note 7 or 8, wherein the real-time data signal is a Real-time Transport Protocol (RTP) packet.

(Supplementary Note 11)

A method to be executed by a security device configured to be used by being connected to a router arranged at a boundary between a Wide Area Network (WAN) and a Local Area Network (LAN) and to a main device of a key telephone system in the LAN, the method comprising:

acquiring a first Internet Protocol (IP) address (R) of the main device on the security device side and a second IP address (Q) of the security device on the main device side;

forming session-establishment address correspondence, the session-establishment address correspondence associating a first type external address information unit (R:r1) of the main device containing the first IP address (R) and a first session establishment port number (r1), a first type external address information unit (P:p1) of the security device containing a third IP address (P) of the security device on the router side and a second session establishment port number (p1) for a connection target telephone on the WAN side, and a terminal number (IDT) and a session-establishment address information unit (G:g1) of the connection target telephone; and setting, to the main device, the first type external address information unit (R:r1) of the main device and a first type internal address information unit (Q:q1) of the security device containing the second IP address (Q).

(Supplementary Note 12)

A non-transitory computer-readable medium storing a control program causing a security device, the security device configured to be used by being connected to a router arranged at a boundary between a Wide Area Network (WAN) and a Local Area Network (LAN) and to a main device of a key telephone system in the LAN, to execute:

acquiring a first Internet Protocol (IP) address (R) of the main device on the security device side and a second IP address (Q) of the security device on the main device side;

forming session-establishment address correspondence, the session-establishment address correspondence associating a first type external address information unit of the main device containing the first IP address (R) and a first session establishment port number (r1), a first type external address information unit (P:p1) of the security device containing a third IP address (P) of the security device on the router side and a second session establishment port number (p1) for a connection target telephone on the WAN side, and a terminal number (IDT) and a session-establishment address information unit (G:g1) of the connection target telephone; and setting, to the main device, the first type external address information unit (R:r1) of the main device and a first type internal address information unit (Q:q1) of the security device containing the second IP address (Q).

This application is based upon and claims the benefit of priority of Japanese Patent Application No. 2021-004763 filed on Jan. 15, 2021, the disclosure of which is incorporated herein in its entirety by reference.

REFERENCE SIGNS LIST

1 System
10 Telephone
20 Main device
30 Security device
31 Acquisition unit
32 Address correspondence formation unit
33 Setting control unit (first setting control unit)
40 Router
50 Telephone
60 Security device
61 Acquisition unit
62 Address correspondence formation unit
63 Setting control unit (first setting control unit)
64 Setting control unit (second setting control unit)
70 Security device
71 Message conversion unit
72 Data signal conversion unit

What is claimed is:

1. A security device configured to be used by being connected to a router arranged at a boundary between a Wide Area Network (WAN) and a Local Area Network (LAN) and to a main device of a key telephone system in the LAN, the security device comprising:

at least one memory storing instructions, and at least one processor configured to execute, according to the instructions, a process comprising:

acquiring a first Internet Protocol (IP) address of the main device on the security device side and a second IP address of the security device on the main device side;

forming session-establishment address correspondence, the session-establishment address correspondence associating a first type external address information unit of the main device containing the first IP address and a first session establishment port number, a first type external address information unit of the security device containing a third IP address of the security device on the router side and a second session establishment port number for a connection target telephone on the WAN side, and a terminal number and a session-establishment address information unit of the connection target telephone; and setting, to the main device, the first type external address information unit of the main device and a first type internal address information unit of the security device containing the second IP address.

2. The security device according to claim 1, wherein the process comprises acquiring a fourth IP address of the router, the fourth IP address being an IP address of the router on the security device side, and a first global IP address of the router.

3. The security device according to claim 2, wherein the session-establishment address correspondence associates the first type external address information unit of the main device, the first type external address information unit of the security device, the terminal number and session-establishment address information unit of the connection target telephone, the first type external address information unit of the security device, and a first type external address information unit of the router containing the first global IP address and the second session establishment port number.

4. The security device according to claim 3, wherein the process comprises setting, to the router, the correspondence between the first type external address information unit of the security device and the first type external address information unit of the router in the session-establishment address correspondence.

5. The security device according to claim 4, wherein the process comprises: receiving a first session establishment message transmitted from the main device, the first session establishment message containing the first type external address information unit of the main device as a source address and the first type internal address information unit of the security device as a destination address, and containing a second type external address information unit containing the first IP address and a first real-time data transmission port of the main device in a data part of the first session establishment message; and converting the received first session establishment message to form a converted first session establishment message addressed to the connection target telephone, the converted first session establishment message contains the first type external address information unit of the security device as a source address and the session-establishment address information unit of the connection target telephone as a destination address, and contains a second type external address information unit of the router containing the first global IP address and a second real-time data transmission port for the connection target telephone in a data part of the converted first session establishment message, and setting, to the router, correspondence between a second type external address information unit of the security device containing the third IP address and the second real-time data transmission port and the second type external address information unit of the router.

6. The security device according to claim 5, wherein the process comprises: receiving a second session establishment message containing the session-establishment address information unit of the connection target telephone as a source address and the first type external address information unit of the security device as a destination address, and containing a real-time data transmission address information unit of the connection target telephone in a data part, and converting the received second session establishment message to form a converted second session establishment message addressed to the main device, and the converted second session establishment message contains the first type internal address information unit of the security device as a source address and the first type external address information unit of the main device as a destination address, and contains a second type internal address information unit of the security device containing the second IP address and a third real-time data transmission port for the connection target telephone in a data part.

7. The security device according to claim 6, wherein the process comprises receiving a real-time data signal containing a second type external address information unit of the main device as a source address and the second type internal address information unit of the security device as a destination address and for converting the received real-time data signal to form a converted real-time data signal, and the converted real-time data signal contains the second type external address information unit of the security device as a source address and the real-time data transmission address information unit of the connection target telephone as a destination address.

8. The security device according to claim 7, wherein the process comprises deleting, when a session for transmission of the real-time data signal between the connection target telephone and another telephone accommodated in the main device is terminated, the correspondence between the second type external address information unit of the security device and the second type external address information unit of the router, the correspondence being set in the router.

9. The security device according to claim 5, wherein the first session establishment message and the second session establishment message are Session Initiation Protocol (SIP) packets.

10. The security device according to claim 7, wherein the real-time data signal is a Real-time Transport Protocol (RTP) packet.

11. A method to be executed by a security device configured to be used by being connected to a router arranged at a boundary between a Wide Area Network (WAN) and a Local Area Network (LAN) and to a main device of a key telephone system in the LAN, the method comprising:

acquiring a first Internet Protocol (IP) address of the main device on the security device side and a second IP address of the security device on the main device side;

forming session-establishment address correspondence, the session-establishment address correspondence associating a first type external address information unit of the main device containing the first IP address and a first session establishment port number, a first type external address information unit of the security device containing a third IP address of the security device on the router side and a second session establishment port number for a connection target telephone on the WAN side, and a terminal number and a session-establishment address information unit of the connection target telephone; and setting, to the main device, the first type external address information unit of the main device and a first type internal address information unit of the security device containing the second IP address.

12. A non-transitory computer-readable medium storing a control program causing a security device, the security device configured to be used by being connected to a router arranged at a boundary between a Wide Area Network (WAN) and a Local Area Network (LAN) and to a main device of a key telephone system in the LAN, to execute:

acquiring a first Internet Protocol (IP) address of the main device on the security device side and a second IP address of the security device on the main device side;

forming session-establishment address correspondence, the session-establishment address correspondence associating a first type external address information unit of the main device containing the first IP address and a first session establishment port number, a first type external address information unit of the security device containing a third IP address of the security device on the router side and a second session establishment port number for a connection target telephone on the WAN side, and a terminal number and a session-establishment address information unit of the connection target telephone; and setting, to the main device, the first type external address information unit of the main device and a first type internal address information unit of the security device containing the second IP address.

* * * * *